United States Patent [19]

Burns et al.

[11] Patent Number: 5,221,821
[45] Date of Patent: Jun. 22, 1993

[54] METHOD FOR PRODUCING AN EXTRUDER BARREL ASSEMBLY

[75] Inventors: Michael T. Burns, Coventry, R.I.; Albert P. Brown, Punta Gorda, Fla.; William A. Kramer, Waterford; Edward J. McGrady, Stonington, both of Conn.

[73] Assignee: Crompton & Knowles Corporation, Stamford, Conn.

[21] Appl. No.: 818,881

[22] Filed: Jan. 10, 1992

[51] Int. Cl.⁵ .............................................. B23K 15/00
[52] U.S. Cl. .................................................. 219/121.14
[58] Field of Search ............... 219/121.13, 121.14, 219/121.12, 121.35; 25/446

[56] References Cited

U.S. PATENT DOCUMENTS

| | | | |
|---|---|---|---|
| 4,182,603 | 1/1980 | Knittel | 425/133.1 |
| 4,185,954 | 1/1980 | Murakami et al. | 425/462 |
| 4,308,655 | 1/1982 | Berger | 29/463 |
| 4,327,859 | 5/1982 | Theysohn | 215/121.14 |
| 4,385,876 | 5/1983 | Scherping et al. | 418/201 |
| 4,553,015 | 11/1985 | Ishii et al. | 214/121.14 |
| 4,875,847 | 10/1989 | Wenger et al. | 425/204 |

Primary Examiner—C. L. Albritton
Attorney, Agent, or Firm—Bernard F. Crowe

[57] ABSTRACT

A method of manufacturing an extruder barrel is disclosed which fabricates a barrel in two longitudinal sections and joins the sections together by electron beam welding. In a preferred form, the barrel sections are formed by machining conical recesses longitudinally in each section whereby a complementary bore is defined by the assembled barrel sections. The machined recesses may be formed with spiral, longitudinal or radial grooves. The recesses may be a uniform conical shape, stepped conical or a dual tapered shape.

49 Claims, 9 Drawing Sheets

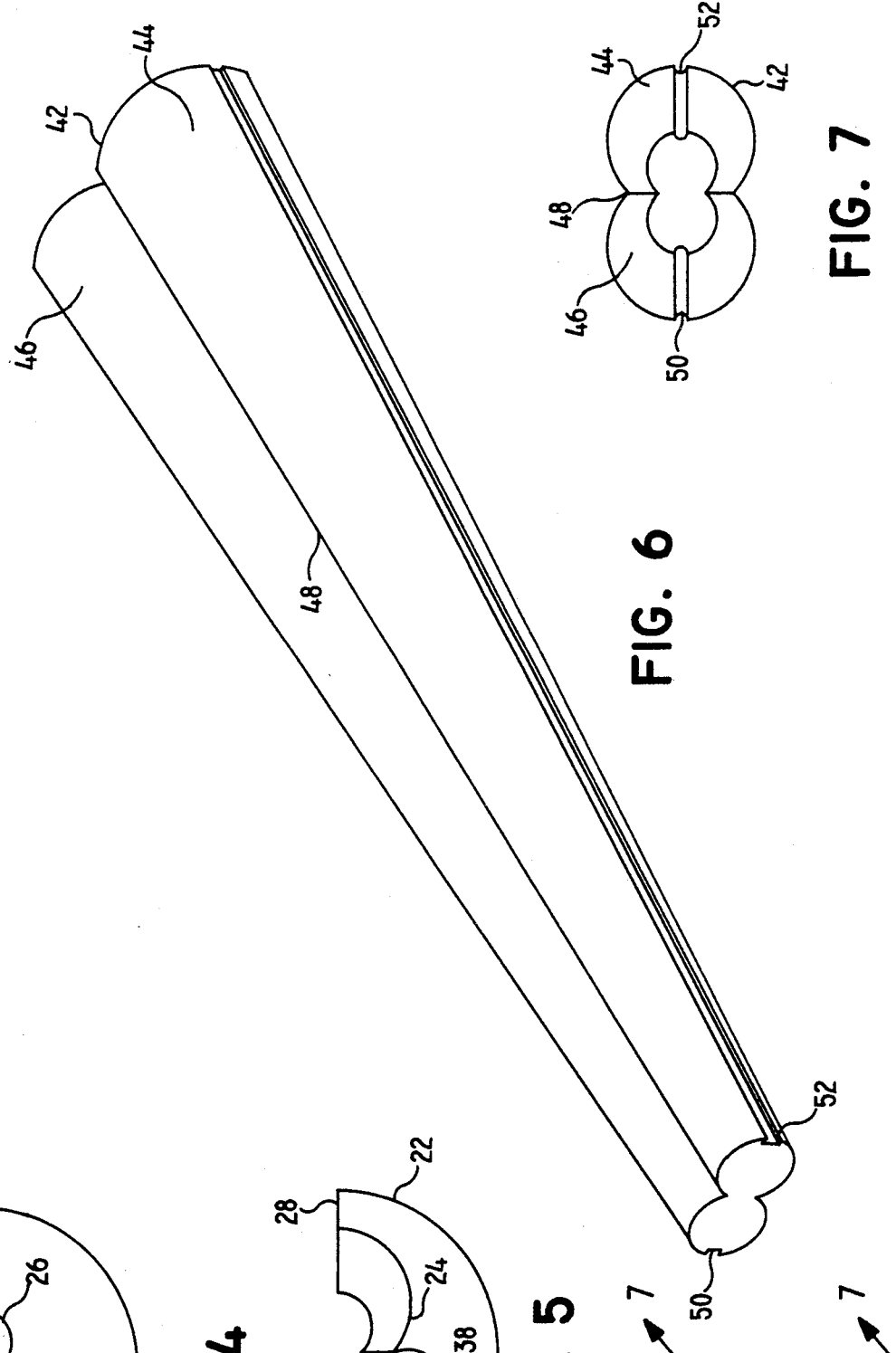

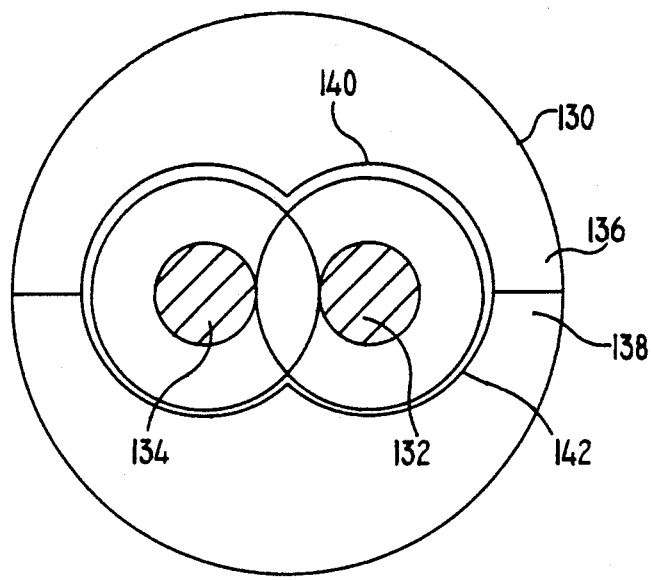
FIG. 13
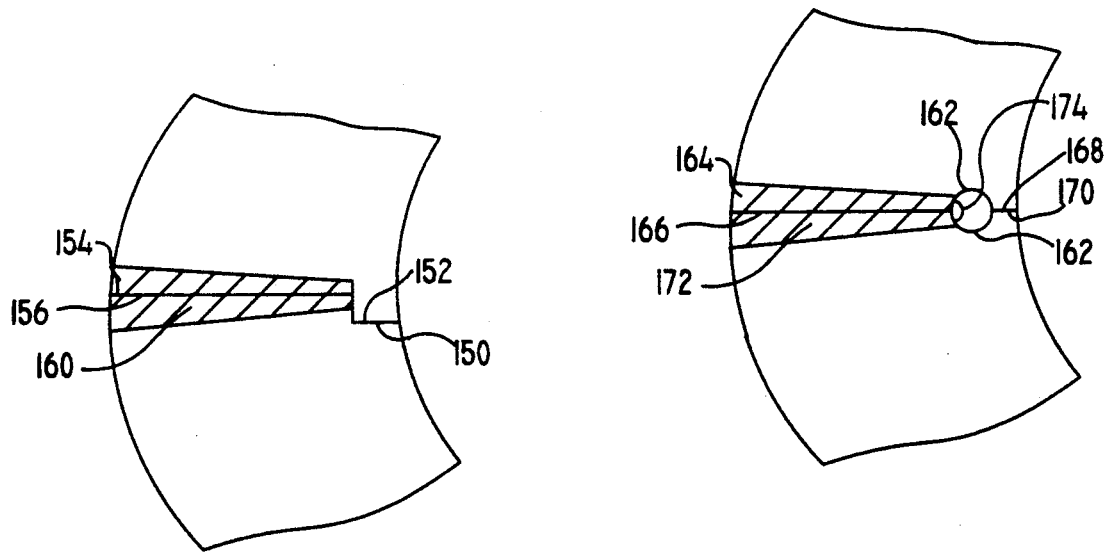
FIG. 14
FIG. 15

METHOD FOR PRODUCING AN EXTRUDER BARREL ASSEMBLY

BACKGROUND OF THE INVENTION

1. Field Of The Invention

The present invention is directed to a method of producing an extruder barrel. More particularly the invention relates to a method of producing an extruder barrel by forming two complementary sections and welding the sections together by electron beam welding to form the extruder barrel.

2. Description Of The Background Art

Extruders are widely used machines in many diverse industries. For example, extruders are typically used in the plastic and rubber fields for forming molded plastic bodies. Extruders provide a convenient and efficient means for melting thermoplastic polymers, mixing components and generating sufficient pressure for injection molding or forming continuous length articles. Extruders are particularly effective in generating the high pressures needed to foam or expand the extruded material when extruded at atmospheric pressure.

Extruders typically include an elongated barrel defining a material inlet at one end and a treated material outlet at the opposite end. Within the bore of the extruder barrel is positioned one or more screws to mix and convey the material through the length of the barrel. The screws include a variety of mixing paddles and spiralling threads of selected pitches to convey the material and generate the pressure needed for extrusion. Under ideal conditions, the extruder screws tend to float within the material as the screws rotate.

Extruders may have a single rotating screw or a plurality of juxtaposed rotating screws. In order to achieve the desired pressures within the barrel, the screws must be closely spaced to the inner wall of the extruder barrel to prevent material from moving backwards in the barrel. Single screw extruders are generally considered to have limited uses in industry due to their limitations in producing high pressures and mixing of components. Twin screw extruders are the more commonly used extruders in the plastics industry due to the ability to generate high pressures to enable extrusion of viscous materials at high rates and pressures. Twin screw extruders have the further advantage of providing more uniform discharge and are less prone to extruder surging.

Twin screw extruders have a pair of parallel juxtaposed elongated screws which are carried within an extruder barrel having a complementary internal bore. The screws may be either corotating or counter-rotating, with the counter-rotating screws being more common. Counter-rotating screws provide better control of mixing and pressure within the extruder barrel. Single screw extruders tend to result in considerable forward and backward movement of the material along the length of the barrel. This often results in slippage of the material, particularly with highly viscous materials. Such slippage does not typically occur or is less likely with twin screw extruders.

In counter-rotating twin screw extruders, a high pressure zone occurs in the area between the screws. This high pressure zone tends to urge the screws outwardly away from each other. Although under ideal conditions the rotating screws float in the material, the screws flex slightly outward as the pressure in this high pressure zone increases. This flexing is more pronounced as the length of the screws increase since the screws are typically supported only at the end in bearings or bushings. The results of this flexing is to produce wear on the extruder screws and the inner wall of the extruder barrel.

Twin screws extruders may have cylindrical shaped bores in the extruder barrel to receive the screws. The screws of the extruder are most often arranged to intermesh with each other. The cylindrical bores of the barrel similarly overlap such that the bore has a figure-8 shape. Twin screw extruders may further have conical shaped screws and conical shaped bores complementing the shape of the screws. Conical extruders are suitable in systems requiring high pressures. The conical shape of the bore and the screws enable the higher pressures to be obtained more easily than in extruders with cylindrical bores and extruder screws.

The high pressures within the extruders and the resulting continuous wear have necessitated that wear resistant materials or coatings be applied to the internal surfaces of the extruder barrel. The surfaces are typically hardened by heat treatment, carburizing or nitriding and by applying a thin layer of wear-resistant material. The wear resistant coatings are usually applied by centrifugal casting at high temperatures or may be applied by welding. These processes are expensive and require significant finishing work after coating to obtain the necessary tolerances required for the extruder barrel. In the case of centrifugal casting, the resultant coating is subject to shrinkage and failure of the coating. Centrifugal casting and other wear surface treating processes are particularly difficult to apply to conical bores and bores with complex shapes.

Several processes have been developed to produce a wear resistant surface on the internal surface of the extruder barrel and to produce a system to reduce the wear of the parts. For example, U.S. Pat. No. 4,875,847 discloses a twin screw extruder having a conical nose section. The discharge end of the extruder barrel includes a central arcuate wall to define a pair of side-by-side, tubular, frusto-conical discharge outlets. The conical discharge outlets are reported to provide more efficient pumping action and to provide a bearing-type support for each screw to reduce contact of the screws against the walls of the extruder barrel. The extruder barrel is formed from half-head sections where the upper and lower half sections are bolted together.

Another example of a wear resistant surface is illustrated in U.S. Pat. No. 4,327,859 disclosing a method of forming the wear-resistant surface in an extruder barrel. A sheet of soft metal and a sheet of hard wear resistant metal are metallurgically bonded together to form a laminate and shaped into a tubular blank having the softer metal facing outward. The blank is inserted into the extruder barrel in a coaxial relationship with the barrel. An explosive charge is detonated inside the blank to expand the blank into contact with the walls of the barrel and bond the soft metal to the barrel.

U.S. Pat. No. 4,385,876 relates to an extruder having a replaceable liner. The extruder barrel is of a clam-shell design where the liner sections are in two halves and complementary in shape to the two sections of barrel. The split sections of the barrel are clamped together by bolts for assembly and disassembly.

A further example of a twin screw extruder is disclosed in U.S. Pat. No. 4,308,655. This device includes a pair of opposing casing shells having a cylindrical inner face. Longitudinal guide bars having outwardly facing concave sections are positioned between the casing shells. The casing shells and the guide bars are clamped together by bolts to form the extruder barrel.

The above-noted methods of producing extruder barrels and wear-resistant surfaces in the barrels are often not suitable for extruder barrels having complex shapes. Extruder barrels having conical bores are generally bored or machined from a single block of metal. The complex shape is not receptive of a wear resistant surface by many conventional methods, such as centrifugal casting. The complex shape of the bore necessitates extensive finishing work to produce the barrel thereby contributing to the expense of the manufacturing process.

The present invention overcomes the limitations of the previous methods of producing an extruder barrel by providing a less costly method of producing the extruder barrel. The method of the invention further enables the formation of hard wear resistant surfaces on complex shaped bores without the requirement of extensive finishing operations.

SUMMARY OF THE INVENTION

The present invention is directed to a method of producing an extruder barrel having a wear resistant surface on the inner surface of the bore. More particularly, the process of the invention is able to produce extruder barrels having intricate conical shaped bores.

The extruder barrel is formed from two symmetrical half sections which are subsequently joined together. The barrel sections are machined from a single block of material having a longitudinal concave recess in one face. The recess is defined by the flat longitudinal outer faces. The recess is machined in the block such that when the two half sections are assembled in an abutting relationship, the recesses define an extruder bore to complement the screw configuration intended to be used in the extruder. In one preferred embodiment of the invention the extruder barrel is adapted for a twin screw extruder. In this embodiment a pair of longitudinal, juxtaposed recesses in an overlapping manner are provided in each half section. The recesses are machined into each half section such that when the half sections are assembled, the recesses define an extruder screw receiving bore having a cross-section complementing the cross-section of the extruder screw. In the embodiment for producing a twin screw extruder the resulting bore has a substantially figure-8 cross-section.

The recess area of the extruder half-sections are then processed or treated to form a hardened wear resistant surface in the extruder screw receiving bore before being combined. In a preferred embodiment, the half sections are subjected to a nitriding treatment to case harden the surface. Once the wear resistant surface has been formed, the two half sections are assembled such that the flat outwardly facing surfaces are contacted to define a hollow bore complementing the extruder screw. The flat faces of each half-section form weld faces and a junction between the two sections. The half-sections are aligned in position with respect to each other using a mandrel corresponding substantially to the transverse and longitudinal internal dimensions of the bore of the assembled barrel. The assembled and aligned half sections are permanently welded using electron beam welding. In a preferred form of the invention at least 95% electron beam penetration is achieved. The mandrel is then removed from the welded extruder barrel and any necessary finishing steps are performed on the bore.

In a preferred embodiment the mandrel is provided with longitudinal recesses cooperating with the junction between the adjoining surfaces of the half sections. In this manner the electron beam can penetrate the depth of the junction without risk of bonding the mandrel to the extruder barrel while maintaining alignment between the sections. To provide uniform welding of the half sections, the flat faces of the half sections defining the weld surfaces are of a substantially constant width along the length of the half sections.

In preferred embodiments of the invention, the extruder is a twin screw extruder having frusto-conical or tapered screws and complementary frusto-conical or tapered recesses in the extruder barrel half sections. The recesses are machined to form complementary tapered recesses uniformally decreasing in width from a first inlet end to a second discharge end of the extruder barrel. In alternative embodiments, the recesses are machined to form an extruder bore having a first conical section having a first angle of convergence and a second conical section having a second angle of convergence. The first and second conical sections may be joined at an apex or joined by a stepped intermediate portion.

In a further embodiment of the invention the two half sections defining the extruder barrel are not identical. In this embodiment one of the half sections is provided with a recess slightly deeper or larger than the recess in the complementary other half section. When the two half sections are joined together and the extruder screw is positioned within the resulting bore, the space around the screws is not uniform. In further embodiments the recesses are machined to form radial, longitudinal or spiralling grooves in the wall of the resulting screw receiving bore to enhance mixing and conveying of the material.

BRIEF DESCRIPTION OF THE DRAWINGS

The invention is illustrated in the drawings of which the following is a brief description.

FIG. 4 is an end view of the embodiment of FIG. 3 taken along line 4—4.

FIG. 5 is an end view of the embodiment of FIG. 3 taken along line 5—5.

FIG. 6 is a perspective view of the mandrel according to a preferred embodiment.

FIG. 7 is an end view of the mandrel of FIG. 6 taken along line 7—7.

FIG. 13 is an end view of a further embodiment showing an asymmetric screw receiving bore.

FIG. 14 is a cross-sectional view of the half sections of the barrel assembled and welded together in accordance with an embodiment of the invention where the mating weld surfaces are formed with a step.

FIG. 15 is a cross-sectional view of the half sections of the extruder barrel assembled and welded together in an alternative embodiment of the invention where the mating surfaces include a relief groove.

DETAILED DESCRIPTION OF THE INVENTION

The disadvantages and limitations of the previous methods of producing and manufacturing extruder barrels are overcome by the present invention while providing a cost effective method of manufacture. The method according to the invention provides the ability to machine and produce intricate internal surfaces in the extruder bores substantially without limitation and to provide for the formation of wear resistant surfaces on the internal bore surfaces.

In the method of the invention the extruder barrel is formed from two complementary extruder barrel half-sections which are welded together. The complementary barrel sections are initially fabricated from a solid piece of suitable metal or other material. The barrel section is machined to produce a longitudinal recess in one flat face of the barrel half. Substantially flat welding faces of uniform width throughout the length of the barrel section are machined on the outer face adjacent the recess. The recess is machined to predetermined specifications complementing the extruder screw which is intended to be used in the assembled extruder barrel, as discussed hereinafter in greater detail.

The machined extruder barrel sections, after machining to produce the longitudinal recess, are subjected to a treatment to form a wear resistant surface on the internal surfaces of the recess defining the extruder bore. Suitable wear resistant surface treatments include nitriding, carburizing and centrifugal casting. In preferred embodiments of the invention, the wear surface treatment is to nitride the surface by heating the barrel sections in a nitrogen containing atmosphere at a pressure sufficient to form a metal nitride, case hardened wear resistant surface.

The barrel sections are assembled by placing the two sections on a mandrel corresponding substantially to the shape and dimension of the bore defined by the recesses of the mating barrel sections. The two mating barrel sections are aligned and welded together by electron beam welding under conditions to achieve at least 95% penetration. In preferred embodiments of the invention it is desirable to obtain 95% penetration to avoid the formation of a weld bead in the inner surface of the barrel which would have to be machined before the barrel could be used. After welding, the mandrel is removed from the assembled extruder barrel. Generally, little or no finishing or machining is needed on the internal surface of the extruder bore upon removal of the mandrel. Electron beam welding at 95% penetration has been found to produce an extruder barrel able to withstand internal pressures of 10,000 psi and higher.

Figure 1:
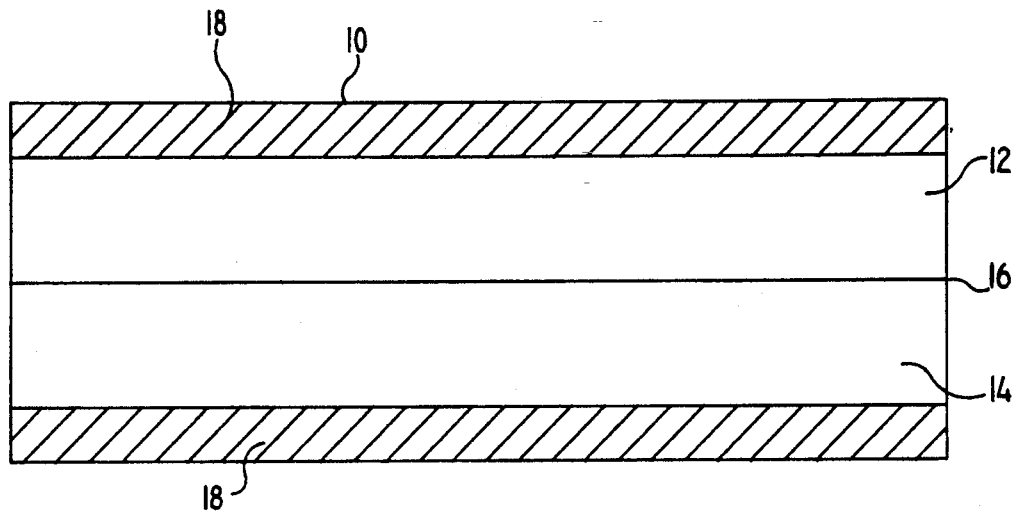
FIG. 1 is a top plan view of one embodiment of the extruder barrel section.
Figure 2:
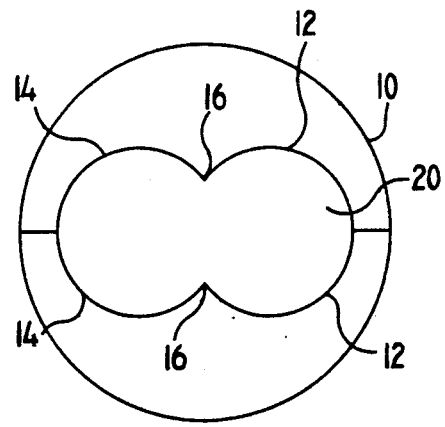
FIG. 2 is a cross sectional view of the assembled extruder barrel.

Referring to FIG. 1, the extruder barrel half sections 10 are fabricated by machining at least one longitudinal recess extending the full length of the barrel section. In preferred embodiments of the invention, the barrel sections are machined to be adapted for twin screw extruders. For twin screw extruders, a pair of juxtaposed longitudinal recesses 12 and 14 are produced in each barrel half section. The two recesses 12 and 14 are disposed parallel to each other in a partially overlapping manner as shown in FIG. 1. The recesses are machined to form two substantially semi-circular recesses with the axis of each recess being spaced apart less than the diameter of the semi-circle. The recesses define the extruder screw receiving bore of the assembled unit and are dimensioned to cooperate with the intermeshing twin screws. The spaced relationship of the axis of the cylindrical recesses 12 and 14 define a central ridge portion 16. Adjacent the cylindrical recesses are machined flat parallel welding surfaces 18. Preferably the welding surfaces 18 are a uniform width along the entire length of the barrel sections. The weld surfaces 18 are further machined to provide a mating surface for joining the two barrel sections together. In the assembled position, the two barrel sections form the extruder barrel to define a screw receiving bore 20 having a substantially figure-8 cross section as illustrated in FIG. 2.

Figure 3:
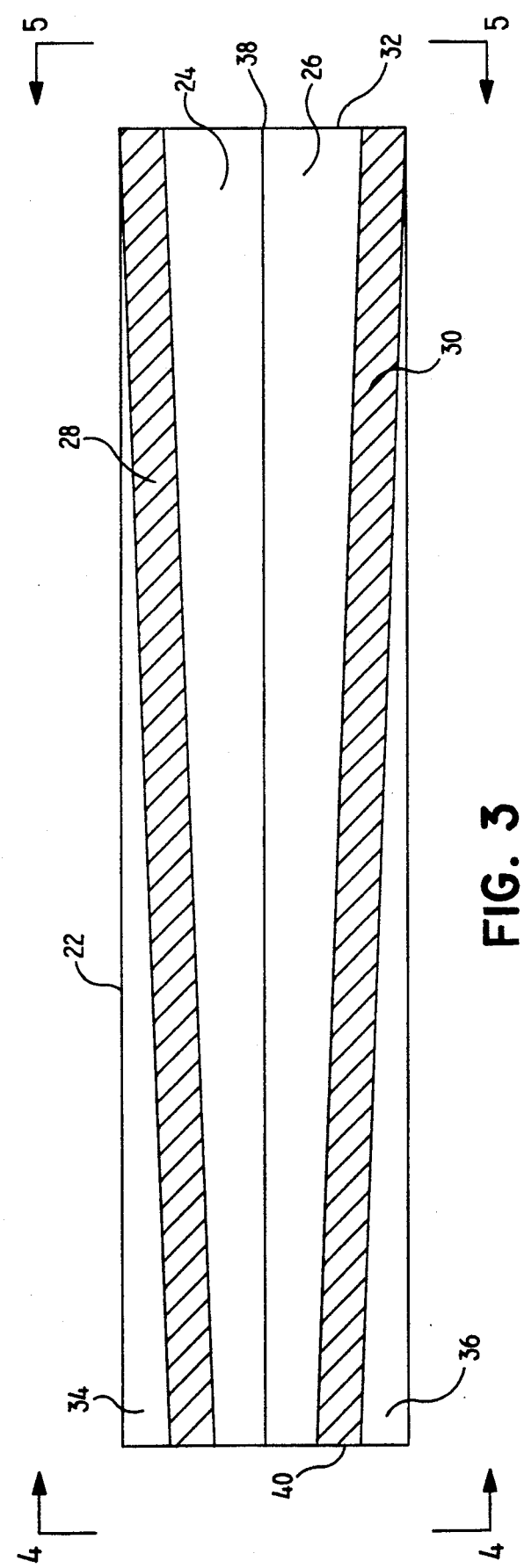
FIG. 3 is a top plan view of an alternative preferred embodiment.

In a particularly preferred embodiment of the invention, the extruder barrel has a pair of juxtaposed, conical bores to receive two cooperating conical shaped extruder screws. As shown in FIG. 3, the extruder barrel is produced in a similar manner as the cylindrical bores of FIG. 1. A pair of symmetrical extruder barrel half sections 22 are fabricated from a block of suitable material. The sections 22 are machined to produce two converging conical shaped recesses 24 and 26. The conical recesses 24 and 26 are juxtaposed in an overlapping manner. The face of the sections 22 are machined to form substantially flat complementary weld faces 28 and 30. As shown, the weld faces 28 and 30 are of a substantially uniform width throughout the length of the barrel section 22.

As shown in FIG. 3, the barrel sections 22 are fabricated from a single block of material having a semi-circular cross-section. The weld faces 28 and 30 are machined to produce stepped portions 34 and 36 along the outer edge. FIG. 4 is an end view of the barrel section 22 showing the barrel in cross-section. As shown, the weld faces 28 and 30 are raised above the stepped portions 34 and 36. The stepped portions enable the weld faces 28 and 30 to be a uniform width and the weld to be formed uniformly along the full length of the weld face, thereby ensuring uniform strength and weld penetration to the assembled barrel.

The two conical recess 24 and 26 are machined to cooperate with two intermeshing conical shaped extruder screws. The recesses are machined in an overlapping fashion as best illustrated in FIG. 4 and FIG. 5. The conical recesses are spaced apart a distance such that a longitudinal ridge portion 38 is formed between the contiguous recesses 24 and 26. FIG. 5 best shows the conical recesses 24 and 26 which are machined in the barrel half section 22. As shown, the conical recesses 24 and 26 are contiguous and disposed in a converging manner toward the downstream end 40.

The extruder barrel is produced by assembling the two barrel half-sections with the weld faces 28 and 30 abutting the cooperating weld faces of the opposing barrel section. The barrel half sections are positioned and aligned with each other by placing the sections on a mandrel 42 cooperating with the shape of the recesses 24 and 26. As shown in FIG. 6 the mandrel 42 has a substantially conical shape having two convex sections 44 and 46 complementing the recesses 24 and 26. As best shown in FIG. 7, the mandrel 42 has a longitudinal valley 48 complementing the ridge portion 38 of the barrel half-section.

The barrel sections are positioned on the mandrel 42 to align the two half-sections. The two barrel sections are generally pre-stressed and initially fixed together by clamps or bolts. In preferred embodiments, the two barrel sections are tack welded to secure the sections together during final welding.

The weld faces are then permanently bonded together by electron beam welding. Preferably the welding obtains at leas 95% penetration. The electron beam welding step uses conventional welding methods of subjecting the weld faces 28 and 30 to an electron beam in a vacuum. Suitable electron beam welding has been obtained using, for example, an acceleration voltage of about 100 KV, a beam current of about 70 to 80 MA and a pressure in the welding chamber of $5 \times 10^{-4}$ torr. Extruder barrels welded by electron beam welding have been tested to withstand internal pressures of 10,000 psi and higher.

The assembled extruder barrel is removed from the vacuum chamber, stress relieved, and the mandrel is removed from the resultant screw receiving bore in the barrel. In preferred embodiments of the invention the mandrel 42 is provided with two longitudinal recessed grooves 50 and 52, as shown in FIG. 7, cooperating with the junction between the weld faces. The grooves 50 and 52 are positioned on the mandrel to align with the abutting weld faces during the welding step to prevent the mandrel from being bonded to the extruder barrel sections in the event a weld bead is formed on the inner surface of the bore.

After the mandrel 42 has been removed from the welded extruder barrel, the bore is honed and polished to the completed form as may be required. Typically, further machining is not necessary after beam welding the barrel sections together using the electron beam process. Preferably, the welds are stressed relieved before being honed and polished.

In an alternative embodiment of the invention the weld surfaces of each the barrel sections are formed with a step 150 and 152 as shown in FIG. 14. The steps 150 and 152 are machined into the weld faces 154, 156 and are positioned proximate to the inner edge of the weld face. Preferably the weld faces 154, 156 are machined slightly undersized compared to the stepped portion 150, 152. The barrel sections are assembled as discussed above and clamped together in a prestressed condition. The barrel sections are then welded together by electron beam welding. As can be seen in FIG. 14, the weld joint formed by electron beam welding penetrates from the outer edge inwardly and produces a tapered weld 160. The steps 150, 152 machined in the weld faces prevent the weld from penetrating into the bore of the extruder barrel. In a preferred embodiment, the weld faces 154,156 have a width about 95% of the width of the joint surface between two barrel sections. The stepped weld faces further provide a means to properly align the barrel to sections during welding and eliminating the need for the mandrel during assembly. Once the barrel sections are welded, the resulting barrel is stress-relieved by releasing the clamping force. By prestressing the barrel sections during welding, the resulting weld is not stressed. In addition, under normal conditions, the portion of the weld face which is not welded inherently forms a stress inducing crack at the joint line in the barrel. By pre-stressing the barrel sections, the stress inducing characteristics of the crack is reduced or eliminated.

In a further embodiment shown in FIG. 15, the weld surfaces of the barrel sections are formed with a relief groove 162. The groove 160, shown in cross-section in FIG. 15, preferably extends the full length of the weld surfaces. The groove 160 divides the mating surfaces of the extruder barrel into weld surfaces 164, 166 and non-weld surfaces 168, 170. Preferably the groove is spaced a slight distance from the inner edge of the bore. The barrel sections are welded together along the weld surfaces 164, 166 by electron beam welding, and the groove is positioned to allow a 95% penetration along the weld surfaces 164, 166 to a form tapered weld 172. In a preferred embodiment, the weld surfaces 164,166 have a width about 95% of the width of the joint between the two barrel sections. The relief groove 162 allows full penetration of the electron beam and provides a void for the weld bead 174 to be formed. In this manner, the weld bead 172 is not formed in the bore of the extruder barrel, which would require additional machining to remove. The weld surfaces 164, 166 are preferably machined slightly undersized compared to the non-weld surfaces 168, 170. During assembly and welding, the barrel sections are clamped to pre-stress the joint during welding. After welding, the clamping pressure is removed. The joints, having been pre-stressed during welding, avoids formation of a stress inducing crack.

The above process allows the production of extruder barrels having complex and intricate shapes which are not readily attainable by conventional boring methods in a solid piece of stock. By fabricating the extruder barrel in two complementary sections, the length of the screw receiving recess, the shape and position are essentially unlimited. The screw receiving recess is readily exposed and can be machined and polished before assembly. This processing can be performed using conventional equipment and does not require the complex equipment needed for the final work within the formed barrel as in conventional practice.

In preferred embodiments, the screw receiving recess receives a wear resistant surface before assembly. Suitable wear resistant surfaces are applied for example by nitriding, carburizing or centrifugal casting. Nitriding is the preferred method of producing a wear resistant surface.

Figure 8:
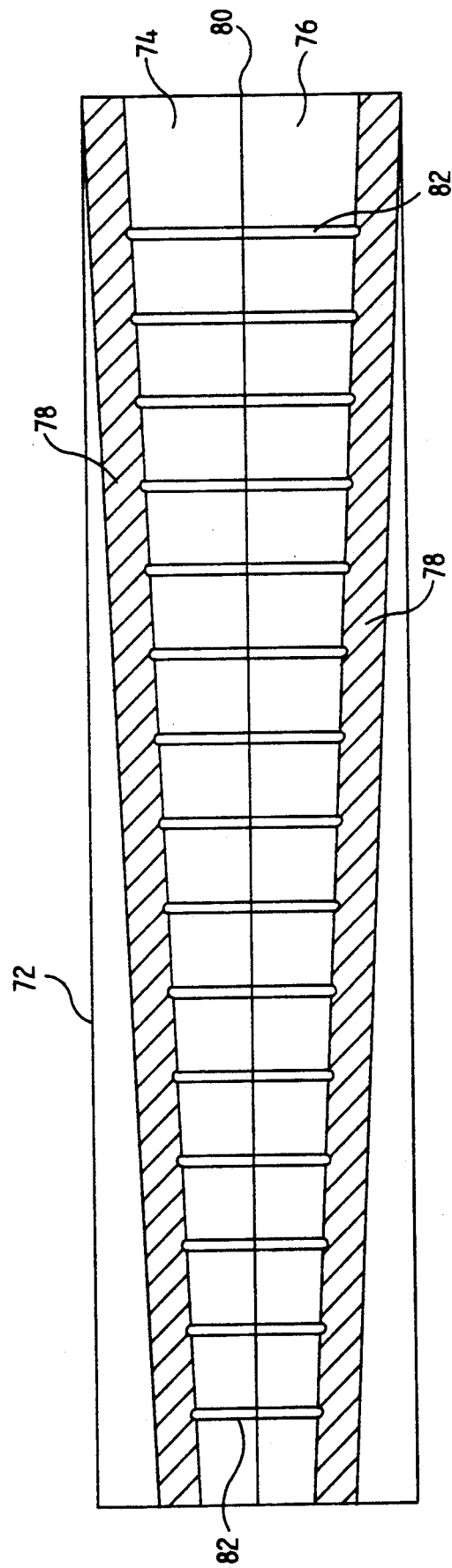
FIG. 8 is a top plan view of an alternative embodiment showing radial grooves.

By fabricating the barrel half sections before assembling to produce the extruder barrel, various shapes and contours to the screw receiving recesses can be formed. Alternative embodiments of the extruder barrel include fabricating the barrel half sections as discussed above and machining grooves in the inner walls of the recess. As shown in FIG. 8, the barrel section 72 is fabricated having two juxtaposed conical shaped recesses 74 and 76 and outwardly facing weld faces 78. A longitudinal ridge portion 80 is formed between the screw-receiving recess. Radial grooves 82 are formed in the wall portion of the recesses 74 and 76. The grooves may be formed by grinding or cutting as known in the art.

Figure 9:
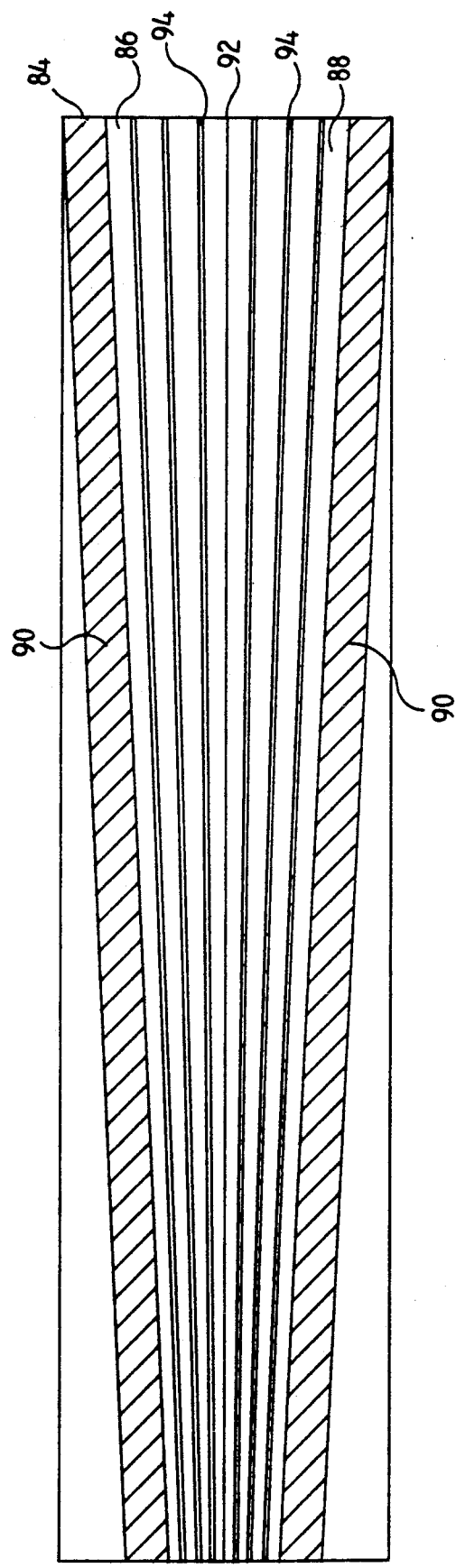
FIG. 9 is a top plan view of a further embodiment showing longitudinal grooves in the recess wall.

In a further embodiment as shown in FIG. 9, the barrel section 84 is fabricated having juxtaposed screw receiving recesses 86 and 88 and outwardly facing weld faces 90. A longitudinal ridge 92 is formed between the recesses 86 and 88. Axial grooves 94 are machined in the wall portion of the recesses. Preferably the axial grooves 94 extend the full length of the barrel section.

Figure 10:
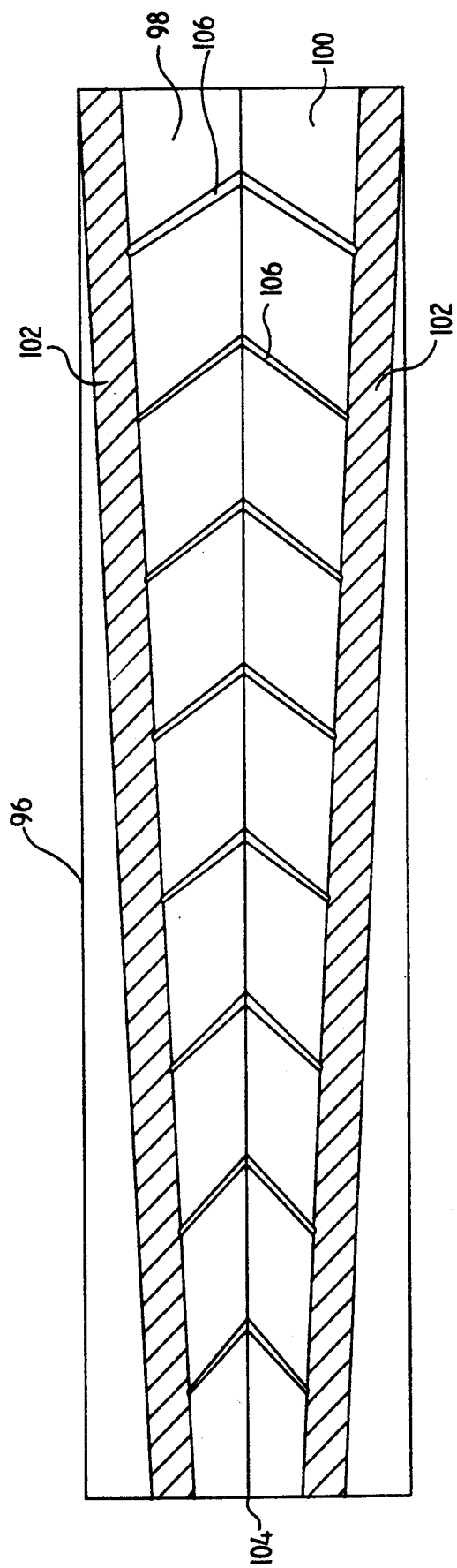
FIG. 10 is a top plan view of a further embodiment showing spiral grooves in the recess wall.

Referring to FIG. 10 a further embodiment shows the extruder barrel half section 96 having two juxtaposed screw receiving recess 98 and 100, outwardly facing weld faces 102 and a longitudinal ridge 104 between the recesses. Spiral grooves 106 are formed in the wall of the recess 98 and 100.

The grooves formed in the inner surface of the bore of the extruder provide a means for selectively controlling the flow of material through the extruder. The grooves may further be provided to increase or decrease operating pressures and residence time in desired zones of the extruded.

Figure 11:
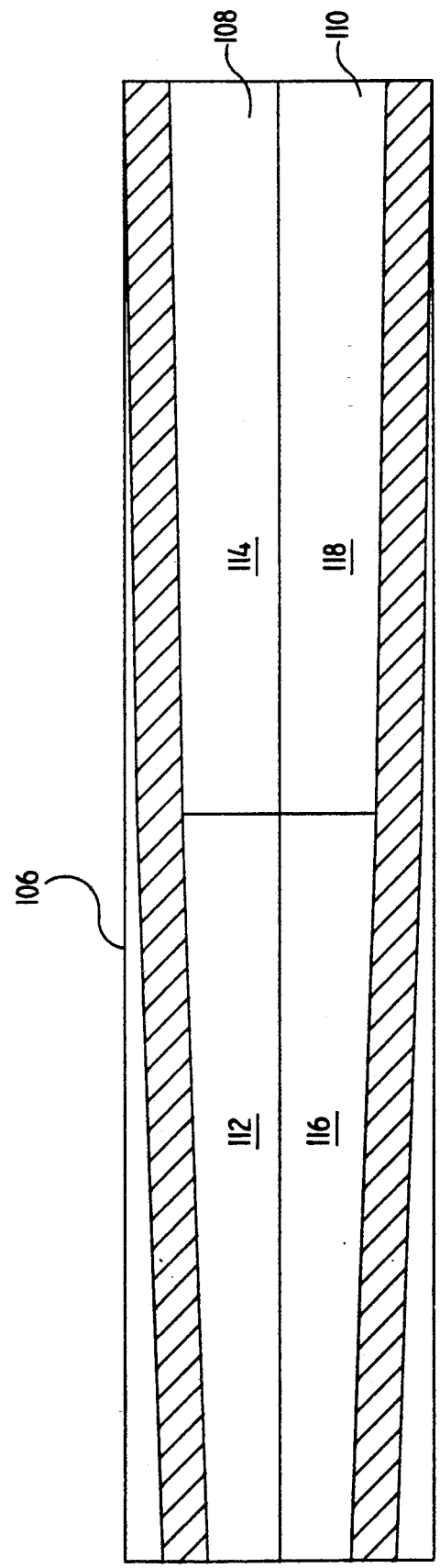
FIG. 11 is a top plan view of a further embodiment showing a dual tapered conical recess.
Figure 12:
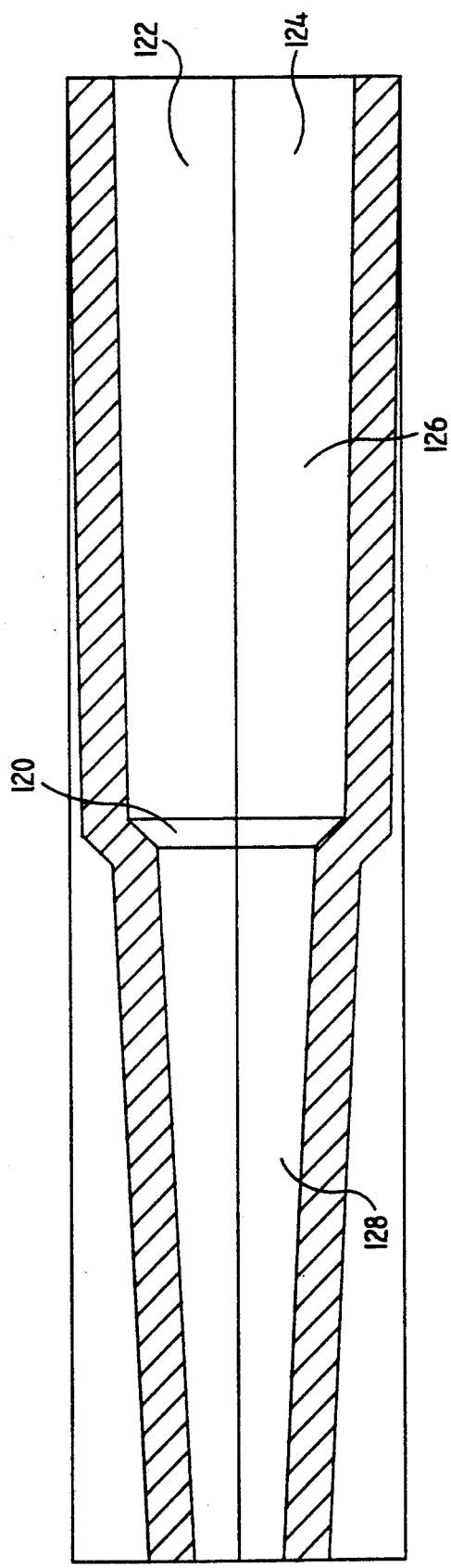
FIG. 12 is a top plan view of a further embodiment showing a stepped conical recess.

Further alternative embodiments of fabricating the extruder barrel from cooperating barrel sections are shown in FIGS. 11, 12, and 13. In FIG. 11 a barrel section 106 is formed having screw receiving recesses 108 and 110. The recess 108 is formed in two zones 112 and 114, and the recess 110 is formed in two zones 116 and 118 respectively. The walls of the recessed defining the zones 112, 116, are machined to have an angle of inclination from the center line greater than the angle of inclination of the zones 114 and 118. In a further embodiment as shown in FIG. 12 an intermediate zone 120 in the screw receiving recesses 122, 124 provide a stepped change between a first conical section 126 and a second conical section 128. As in the embodiment of FIG. 11, the walls of the recess shown in FIG. 12 define upstream and downstream zones in the extruder barrel. In FIG. 12 the walls of the downstream zone have an angle of inclination from the center line greater than the angle of inclination of the upstream end.

The embodiment shown in FIG. 13 is a cross section of the assembled extruder barrel 130 having a pair of counter-rotating extruder screws 132, 134 received in an asymmetrical bore. The extruder barrel is formed from two cooperating barrel half sections 136 and 138. Each half section is formed with screw receiving recesses 140 and 142 to accommodate the extruder screws. As shown in FIG. 13 the recesses 140 and 142 are not symmetrical such that the clearance between the screws and the surface of the recess 140 and 142 are not the same. As shown, the recess 140 is larger than the recess 142 to create a void on one side of the screws. In operation of the extruder, the differential in clearance produces mixing and conveying properties not obtainable by symmetrical bores.

The above description is intended to be exemplary of the preferred embodiments of the invention and not limiting of the scope of the invention. It will be apparent that other embodiments can be obtained by those skilled in the art without departing from the scope of the invention.

We claim:

1. A method for producing an extruder barrel of the type having at least one extruder screw rotatably mounted within the barrel, said method comprising:
   a) fabricating first and second complementary longitudinal extruder barrel sections having a longitudinal dimension, each of said sections having complementary outwardly facing welding faces and longitudinal extruder screw receiving recesses, said recesses having a cross-section complementary to the cross-section of an extruder screw;
   b) abutting said complementary welding faces of said first and second extruder barrel sections to define an extruder barrel having a longitudinal bore; and
   c) joining said first and second barrel sections by welding the complementary welding faces by electron beam welding.

2. The method of claim 1 comprising welding said complementary welding faces together by electron beam welding whereby at least 95% penetration of said electron beam is achieved.

3. The method of claim 1 wherein said extruder barrel is a twin screw extruder barrel and wherein said extruder screw receiving recesses in said first and second barrel sections comprise two juxtaposed, longitudinally disposed recesses having substantially semi-circular cross-sections and disposed such that when said first and second barrel sections are abutted, said bore having a substantially figure-8 cross-section.

4. The method of claim 3 wherein said extruder screw receiving recess is substantially frusto-conical shaped decreasing in width in said longitudinal dimension from a first end to a second end of said section.

5. The method of claim 1 comprising forming a hardened wear surface on a surface of said extruder screw receiving recess.

6. The method of claim 5 comprising nitriding the surface of said extruder screw receiving recess to form a wear resistant surface.

7. The method of claim 1 further comprising positioning and aligning the first and second extruder barrel sections in step (b) on a mandrel before welding, and removing said mandrel after said welding step, wherein said mandrel is dimensioned to complement the longitudinal bore.

8. The process of claim 7 wherein said mandrel includes longitudinal grooves cooperating with said welding faces.

9. The method of claim 1 comprising forming grooves in said extruder screw receiving sections before abutting said sections in step (b).

10. The method of claim 9 wherein said grooves are spirally, longitudinally or radially disposed with respect to said longitudinal dimension of said section.

11. The method of claim 1 further comprising the step of producing a longitudinal groove in at least one of said welding faces to define a first weld surface adjacent an outer edge of said barrel section and a second weld surface adjacent an inner edge of said barrel section.

12. The method of claim 11 comprising producing said groove whereby said first weld surface is a width about 95% of width of said welding face.

13. The method of claim 11 comprising producing a longitudinal groove in said welding faces of each barrel section, said grooves being positioned to define a longitudinal substantially annular bore in said welding faces when said barrel sections are assembled.

14. The method of claim 11 comprising welding said welding faces by electron beam welding to attain a penetration from an outer edge of said barrel section to said groove.

15. The method of claim 11 comprising producing said second weld surface oversized with respect to said first weld surface, and abutting said welding faces under pressure during welding to pre-stress said welding faces.

16. The method of claim 1 further comprising the step of producing a step in said welding faces of said extruder barrel sections.

17. The method of claim 16 wherein said step in said welding faces forms a substantially L-shaped joint between said extruder barrel sections when assembled, said joint defining a first weld step adjacent an outer edge of said barrel section and a second weld step adjacent an inner edge of said barrel section.

18. The method of claim 17 comprising producing said step in said welding face whereby said first step has a width about 95% of a width of said welding face.

19. The method of claim 17 comprising producing said second weld surface oversized with respect to said first weld surface, and abutting said welding faces under pressure during welding to pre-stress said welding faces.

20. A method for producing an extruder barrel for a counter-rotating twin screw extruder, said method comprising:
   a) fabricating first and second complementary extruder barrel sections having a longitudinal dimension, each of said sections having complementary outwardly facing welding faces and a pair of longitudinal extruder screw receiving recesses, said recesses having a cross-section complementary to a cross-section of a pair of counter-rotating extruder screws;
   b) abutting the complementary welding faces of said first and second barrel sections to define an extruder barrel and to define a longitudinal bore, wherein said bore has a substantially figure-8 cross-section; and
   c) welding said welding faces together by electron beam welding to form an integral extruder barrel.

21. The method of claim 20 comprising welding said complementary welding faces together by electron beam welding whereby at least 95% penetration of said electron beam is achieved.

22. The method of claim 20 wherein said extruder screw receiving section is substantially frusto-conical shaped decreasing in width in said longitudinal dimension from a first end to a second end of said section.

23. The method of claim 20 comprising forming a hardened wear surface on the surface of said extruder screw receiving recessed section.

24. The method of claim 23 comprising nitriding the surface of said extruder screw receiving recess to form a wear resistant surface.

25. The method of claim 20 comprising positioning and aligning the first and second extruder barrel sections in step (b) on a mandrel before welding, and removing said mandrel after said welding step, wherein said mandrel is dimensioned to complement the longitudinal bore.

26. The process of claim 25 wherein said mandrel includes longitudinal grooves cooperating with said welding faces.

27. The method of claim 20 comprising forming grooves in said extruder screw receiving sections before abutting said sections in step (b), wherein said grooves are spirally, longitudinally or radially disposed with respect to said longitudinal dimension of said section.

28. The method of claim 20 further comprising the step of producing a longitudinal groove in at least one of said weld faces to define a first weld surface adjacent an outer edge of said barrel section and a second weld surface adjacent an inner edge of said barrel section.

29. The method of claim 28 comprising producing said groove whereby said first weld surface is a width about 95% of width of said welding surface.

30. The method of claim 28 comprising producing a longitudinal groove in said welding faces of each barrel section, said grooves being positioned to define a longitudinal substantially annular bore in said welding faces when said barrel sections are assembled.

31. The method of claim 28 comprising welding said welding faces by electron beam welding to attain a penetration from an outer edge of said barrel section to said groove.

32. The method of claim 28 comprising producing said second weld surface oversized with respect to said first weld surface, and abutting said welding faces under pressure during welding to pre-stress said welding faces.

33. The method of claim 20 further comprising the step of producing a step in said welding faces of said extruder barrel sections.

34. The method of claim 33 wherein said step in said welding faces forms a substantially L-shaped joint between said extruder barrel sections when assembled, said joint defining a first weld step adjacent an outer edge of said barrel section and a second weld step adjacent an inner edge of said barrel section.

35. The method of claim 34 comprising producing said step in said welding face whereby said first weld step has a width about 95% of a width of said welding face.

36. The method of claim 34 comprising producing said second weld surface oversized with respect to said first weld surface, and abutting said welding faces under pressure during welding to pre-stress said welding faces.

37. A method for producing an extruder barrel for a counter-rotating twin screw extruder, said method comprising:
   a) fabricating first and second complementary extruder barrel sections having a longitudinal dimension, each of said sections having complementary outwardly facing welding faces and a pair of longitudinal extruder screw receiving recesses, said recesses having a cross-section complementary to a cross-section of a pair of counter-rotating extruder screws;
   b) abutting the complementary welding faces of said first and second barrel sections to define an extruder barrel and to define a longitudinal bore, wherein said bore has a substantially figure-8 cross-section; and
   c) welding said welding faces together by electron beam welding to form an integral extruder barrel;
   wherein said recesses define a first upstream portion having a substantially conical shape decreasing in width from a first end to a second end and having a first angle of convergence from a center line, said recesses further defining a second downstream portion having a conical shape decreasing in width from said first end to a second end and having a second angle of convergence.

38. The method of claim 37 wherein said first angle of convergence is greater than said second angle of convergence.

39. The method of claim 37 wherein said recess further defines a stepped intermediate portion between said first upstream portion and said second downstream portion.

40. The method of claim 37 further comprising forming a hardened wear surface on a surface of said extruder screw receiving recessed section.

41. The method of claim 40 further comprising nitriding said surface of said extruder screw receiving recess to form a wear resistant surface.

42. The method of claim 37 further comprising positioning and aligning said first and second extruder barrel sections in step (b) on a mandrel before welding, said mandrel being dimensioned to complement the longitudinal bore, and further comprising removing said mandrel after said welding.

43. The method of claim 42 wherein said mandrel includes longitudinal grooves cooperating with said welding faces.

44. The method of claim 37 comprising forming grooves in said extruder screw receiving sections before abutting said sections in step (b), wherein said grooves are spirally, longitudinally, or radially disposed with respect to said longitudinal dimension of said barrel section.

45. The method of claim 37 further comprising welding said welding faces together by electron beam welding to obtain at least 95% penetration.

46. The method of claim 45 further comprising welding at a current of about 70 to 80 MA, an acceleration voltage of about 100 KV and a pressure of $5 \times 10^{-4}$ Torr.

47. A method for producing an extruder barrel for a twin screw counter-rotating extruder, said method comprising:
a) fabricating a first longitudinal extruder barrel section having a longitudinal dimension said first section having an outwardly facing welding face and a first longitudinal extruder screw receiving recesses, said recess having a cross-section complementary to the cross-section of an extruder screw;
b) fabricating a second longitudinal extruder barrel section having a longitudinal dimension, said second section having an outwardly facing welding face complementing said first weld face and a second longitudinal extruder screw receiving recess, said second recess having a cross-section complementing said first recess and being larger than said first recess;
c) abutting said complementary welding faces of said first and second extruder barrel sections to define an extruder barrel having an asymmetrical longitudinal, extruder screw-receiving bore; and
d) jointing said first and second barrel sections by welding the complementary welding faces by electron beam welding.

48. The method of claim 47 comprising welding said complementary welding faces together by electron beam welding whereby at least 95% penetration of said electron beam is achieved and wherein said complementary welding faces are substantially adjacent and parallel to an edge of said recesses.

49. The method of claim 47 wherein said extruder screw receiving recess is substantial frusto-conical shaped decreasing in width in said longitudinal dimension from a first end to a second end of said section.

* * * * *